United States Patent
Wimmer et al.

(10) Patent No.: US 6,625,223 B1
(45) Date of Patent: Sep. 23, 2003

(54) METHOD AND APPARATUS FOR ENCODING, TRANSMITTING AND DECODING DIGITAL DATA

(75) Inventors: Bernhard Wimmer, München (DE); Thomas Stockhammer, München (DE)

(73) Assignee: Siemens Aktiengesellschaft (DE)

( * ) Notice: Subject to any disclaimer, the term of this patent is extended or adjusted under 35 U.S.C. 154(b) by 0 days.

(21) Appl. No.: 09/423,502
(22) PCT Filed: May 7, 1998
(86) PCT No.: PCT/DE98/01274
§ 371 (c)(1), (2), (4) Date: Jan. 4, 2000
(87) PCT Pub. No.: WO98/51039
PCT Pub. Date: Nov. 12, 1998

(30) Foreign Application Priority Data

May 7, 1997 (DE) .......................... 197 19 468

(51) Int. Cl.$^7$ .............................................. H04L 27/00
(52) U.S. Cl. ....................... 375/259; 375/341; 375/359
(58) Field of Search ................................ 375/259, 295, 375/316, 341, 365, 240.24, 240.27, 240.28, 359; 714/746, 759, 779, 791, 798; 370/395, 397, 503, 506, 468; 348/398.1, 425.4, 478, 495

(56) References Cited

U.S. PATENT DOCUMENTS

| | | | |
|---|---|---|---|
| 4,229,818 A | | 10/1980 | Matyas et al. |
| 4,293,951 A | | 10/1981 | Rhodes |
| 4,736,369 A | | 4/1988 | Barzilae et al. |
| 5,361,261 A | | 11/1994 | Edem et al. |
| 5,544,176 A | * | 8/1996 | Fujii et al. .............. 348/390.1 |
| 5,805,602 A | * | 9/1998 | Cloutier et al. ............. 348/497 |
| 5,903,324 A | * | 5/1999 | Lyons et al. ................ 348/495 |
| 6,037,932 A | * | 3/2000 | Feinleib ..................... 348/478 |
| 6,115,537 A | * | 9/2000 | Yamada et al. ............. 386/109 |
| 6,366,959 B1 | * | 4/2002 | Sidhu et al. ................ 709/214 |

FOREIGN PATENT DOCUMENTS

| | | |
|---|---|---|
| EP | 0 666 652 | 8/1995 |
| EP | 0 690 630 | 1/1996 |
| EP | 0 739 139 | 10/1996 |

OTHER PUBLICATIONS

Tanenbaum, Andrew, "Computer Networks", (1996), Prentice–Hall International, Upper Saddle River, New Jersey, US XP002081696, pp. 183–190; 275–287; 731–744.

ITU–H.223, "Multiplex Protocol for Low Bit Rate Multimedia Communication", (1993–1996), pp. 1–26.

Biala, Jacek, "Mobilfunk und Intelligente Netze", (1994–1995), p. 285.

* cited by examiner

Primary Examiner—Chi Pham
Assistant Examiner—Emmanuel Bayard
(74) Attorney, Agent, or Firm—Bell, Boyd & Lloyd, LLC

(57) ABSTRACT

A method and corresponding apparatus first encodes digital data by grouping the data into a data segment. A particular length of the data segment is placed into check information encoded within the data segment. The encoded data segments are then transmitted from a first computer to a second computer that receives and decodes the data segments. The second computer decodes the received data segments dependent on the particular length information that was placed in the check information during encoding of the data segment. Decoding dependent upon the particular length information provides dependable synchronization and improved resistance to the introduction of errors, accordingly.

66 Claims, 2 Drawing Sheets

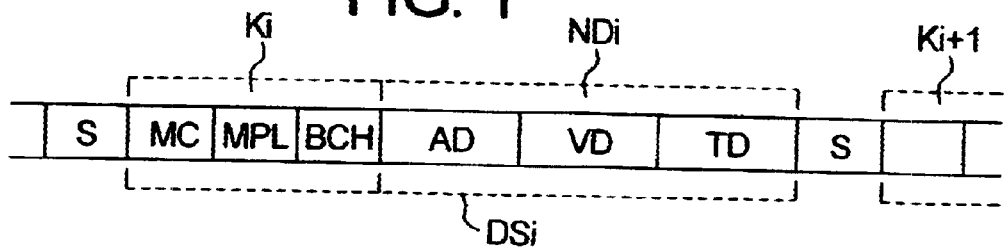
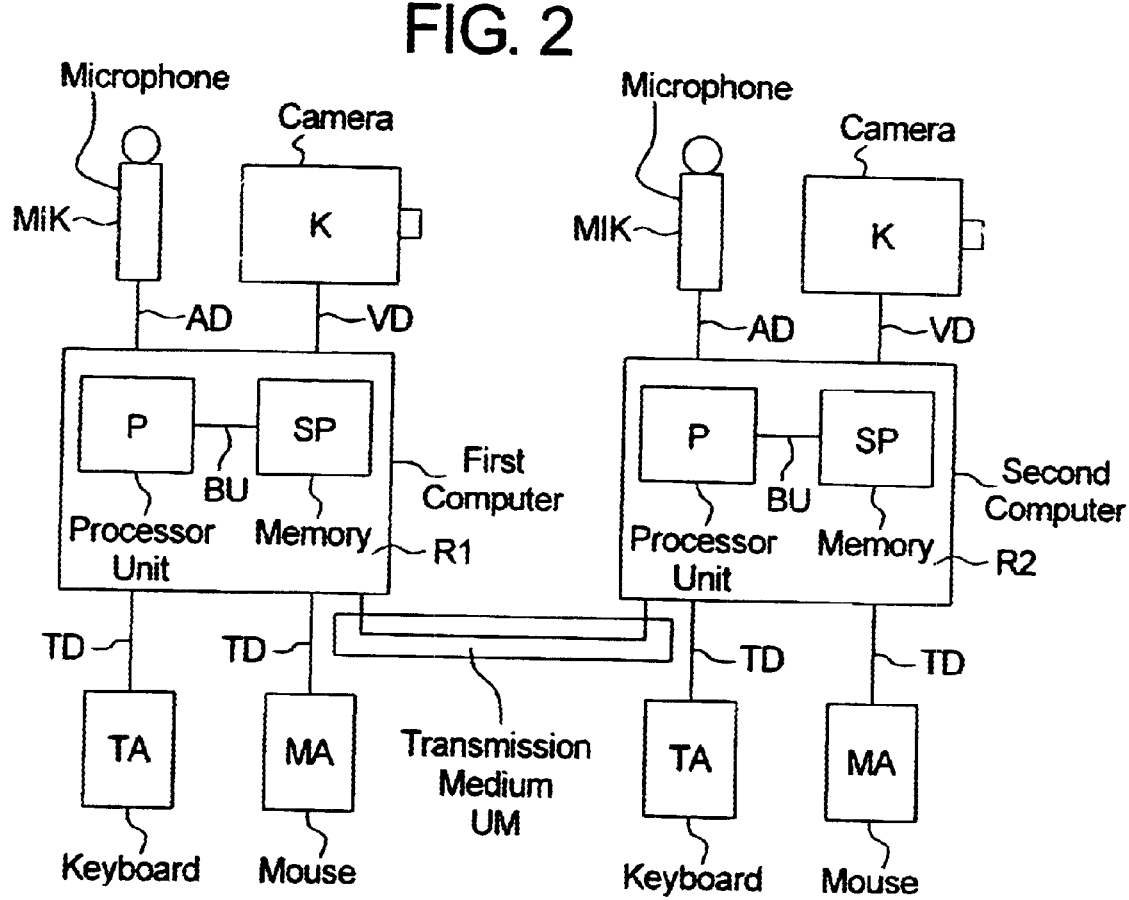

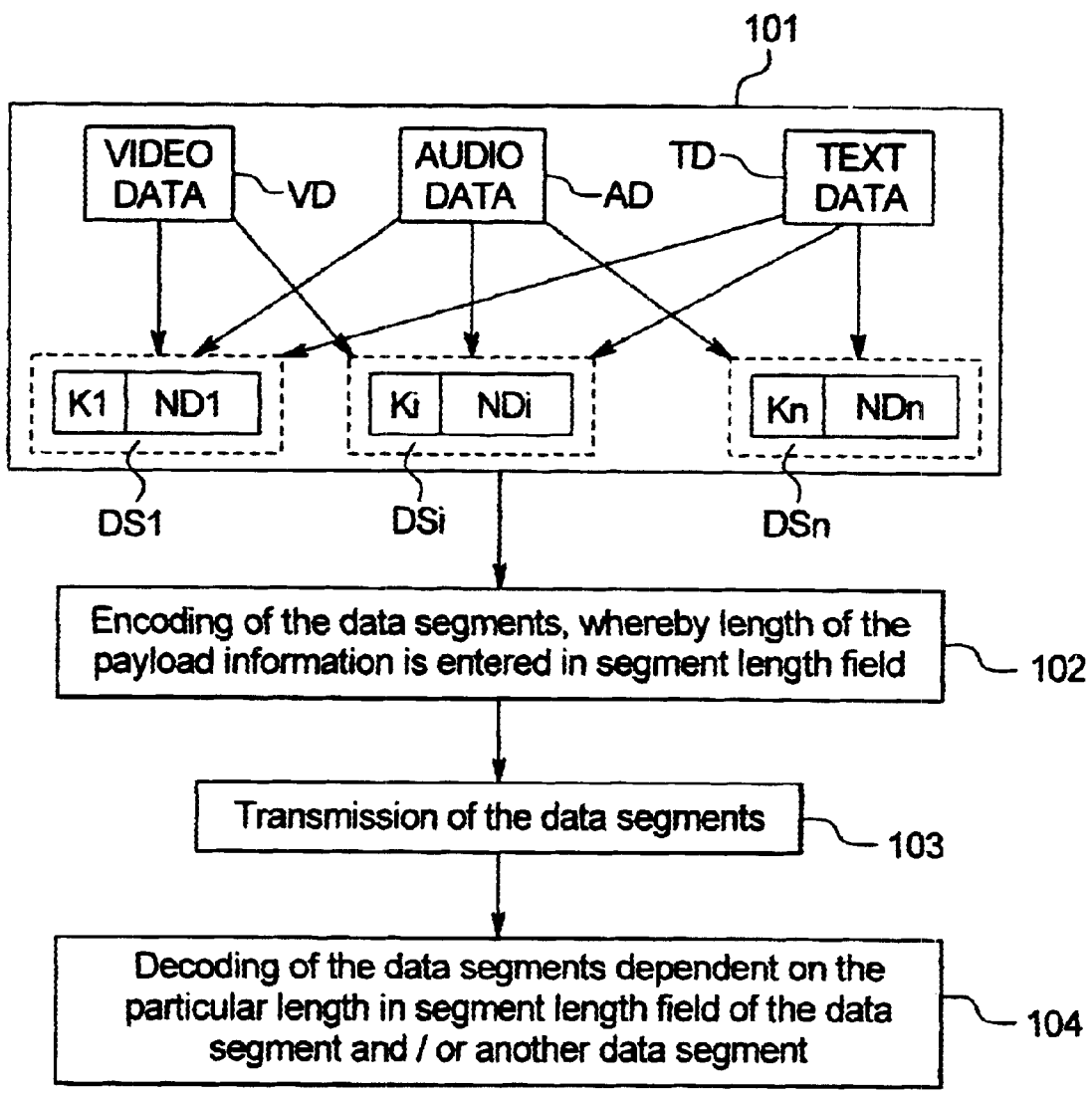

METHOD AND APPARATUS FOR ENCODING, TRANSMITTING AND DECODING DIGITAL DATA

BACKGROUND OF THE INVENTION

1. Field of the Invention

The invention is directed to the encoding, transmission and decoding of digital data that are, grouped into data segments of variable length.

2. Description of the Prior Art

In what is referred to as packet-oriented data transmission, the data transmitted as digital data are grouped into data segments that comprise a permanent prescribed or a variable segment length. The data segments are channel-encoded and transmitted.

Digital data are, for example, digital video data, digital audio data or digital text information such as in the ASCII format.

When variable segment lengths are allowed for the data segments, a problem arises for the receiving station of synchronizing correctly to the received sequential bit stream in view of the data segments (i.e., to respectively correctly find the start of a data segment). This job is usually carried out by a multiplexer.

The multiplex protocol ITU-H.223 of the picture telephony standard ITUH-H.324 is described in ITU-H.223, International Telecommunications Union, Multiplex Protocol for Low Bit Rate Multimedia Communication, 1996. Variable segment lengths are employed in the multiplex protocol ITU-H.223. The individual data segments are separated from one another by what is referred to as a synchronization word or HDLC Flags, (High Level Data Link Control Flags). The HDLC flag is composed of the bit sequence "0111 1110". In order to prevent an incorrect classification (emulation) of an identical bit sequence occurring in the data segment as synchronization word, each data segment is investigated for the bit sequence "11111" (five successive bits having the value "1") in the encoding. When such a bit sequence is found, then one bit having the value "0" is automatically inserted. This procedure is referred to as bit stuffing.

This method exhibits poor properties given a faulty transmission channel, for example in the radio transmission according to the GSM method or the DECT method. As a result of the faulty transmission channel, the synchronization word is often not found when an error occurs in the synchronization word during the, transmission. A transmission error in the data segment can also lead to emulation of the synchronization word, this leading to an incorrect synchronization at the receiver of the transmitted data segment.

EP-A-0 690 630 discloses a method and an arrangement for the transmission of digital data. Given the method disclosed in EP-A-0 699 630, digital data are encoded according to a "serial digital data interface (SDDI) format, are transmitted and decoded. An apparatus correspondingly matched to the SDDI format is employed for the encoding, transmission and decoding.

EP-A-0 666 652 discloses a method for decoding a digital signal with variable length. Given the procedure disclosed by EP-A-0 666 652, the length of a received digital signal is respectively processed such before the actual decoding of received digital signals that the processed digital signal comprises a predetermined maximum length.

SUMMARY OF THE INVENTION

The invention is thus based on the problem of specifying methods and devices with which a dependable synchronization to the data segments is achieved.

According to a method of the present invention, the digital data are grouped into at least one data segment. The data segment is encoded, wherein a length of the data segment is entered into check information of the data segment during the encoding.

In addition the data segment, which contains check information having a particular length of the data segment, is decoded dependent on the particular length of the data segment.

In a further embodiment the data segments, which contain check information having a particular length of the data segment, are decoded dependent on the particular length of at least one other data segment.

An apparatus of the present invention for decoding digital data comprises a processor unit that is configured to decode the received data segment dependent on the particular length of the data segment encoded into the data segment and also the synchronization information.

The apparatus of the present invention can be comprised of a computer, having a programmable microprocessor as the processor unit. The encoding and decoding of the digitized images in the present invention ensues upon employment of a computer program that is programmed such that the corresponding method steps are implemented by the computer.

The apparatus can also be specific hardware modules, such as a specific computer card for encoding or, decoding example.

It will be appreciated by those skilled in the art that the present invention utilizing a particular length of the respective data segment contained in the check information of the data segment results in a reliable synchronization and, thus improved resistance to errors.

The resistance to errors is further improved in a an embodiment of the invention in that a synchronization word is also employed in addition to the particular segment length and the technique of bit stuffing may also be employed.

For further enhancing the resistance to error, it is also advantageous in an embodiment to secure the specification of the segment length and/or a specification about the type of data contained in the data segment with error recognition information and/or error correction information.

Additional advantages and novel features of the invention will be set forth in part in the description which follows and, in part, will become apparent to those skilled in the art upon examination of the following, or may be learned by practice of the invention. The Advantages of the invention may be realized and obtained by means of the instrumentalities and combinations particularly pointed-out in the attended claims.

BRIEF DESCRIPTION OF THE DRAWINGS

The figures showed a preferred exemplary embodiment of the invention, which is explained in greater detail below.

Shown are:

FIG. 1 which is a sketch of the structure of a data segment having check information and payload data information;

FIG. 2 which is a sketch of a computer arrangement having two computers and a transmission medium for encoding, transmission and decoding of digital data; and FIG. 3 which is a flowchart wherein the method steps of the method are shown.

DETAILED DESCRIPTION OF THE PREFERRED EMBODIMENTS

FIG. 2 shows a camera K with which a sequence of images B are registered and supplied as digital video data VD to a first computer R1 and stored. A voice signal SS is registered via a microphone MIK and is supplied as digitized audio data AD to the first computer R1 and is stored. Input of text information TD is performed via a keyboard TA and/or a mouse MA. The first computer R1 also comprises a picture screen BS for displaying arbitrary information.

The first computer R1 is connected to a second computer R2 via a transmission medium UM, for example a cable or a radio tense mission link. The digital data encoded by the first computer R1 are transmitted via the transmission medium UM to the second computer R2 and which decodes the encoded data. The first computer R1 and the second computer R2 both include a memory SP and a processor unit P that are connected to one another via a bus BU. The processor unit P of the first computer R1 is conformed to implement method steps explained below for encoding the digital data are implemented. The processor unit P of the second computer R2 is fashioned such that the received, encoded data are decoded in conformity with the method described below. The second computer R2 likewise comprises a picture screen BS for displaying arbitrary information as well as a keyboard TA and/or a mouse MA, a camera K and a microphone MIK.

The digital data, video data VD, audio data AD and/or text data TD are grouped into at least one data segment DSi (i=1 ... n) in the first computer R1 (Step 101; see FIG. 3).

The data segment DSi contains check information Ki and payload information NDi, which is the actual digital data to be transmitted.

The structure of the data segment DSi is shown in FIG. 1.

The data segment DSi comprises a synchronization word S (HDLC Flag) composed of the bit sequence "0111 1110".

The check information Ki contains information required for the transmission. Information conconcerning the type of data and the sequence are contained in the payload data information NDi in a multiplex code field MC having a length of 4 bits.

The length of the payload data information NDi is indicated with a segment length field MPL and, thus, the length of the data segment DSi is also implicitly indicated since the check information Ki and the synchronization word S comprise a fixed, prescribable length. The segment length field MPL comprises a length of 7 bits, wherein a maximum length of the payload data information NDi of 126 bytes can be described. The value 127 is reserved for the case wherein the payload data information NDi is longer than 126 bytes.

A field contains error recognition information and/or error correction information for the data contained in the check information Ki. The BCH field comprises a length of 4 bits. The field contains the BCH code (15, 11) formed over the check information Ki with a free distance of 3. An error can be corrected with the BCH code (15, 11) and further errors can be recognized.

The payload information NDi contain video data VD, audio data AD and text data TD.

The data segment DSi or, the data segments DSi are encoded, wherein the length of the payload data information in the ith data segment is entered into the segment length field MPL by the first computer R1 (see Step 102 in FIG. 3).

The encoded data segment DSi is transmitted from the first computer R1 to the second computer R2 (see Step 103).

The data segments DSi received by the second computer R2 are decoded dependent on the particular length in the segment length field MPL of the data segment DSi and/or dependent on the particular length in the segment length field MPL of another data segment DSj, j≠i (see Step 104).

Decoding proceeds in that the synchronization word S is first identified in the received bit stream in order to find the start of a data segment DS1 within the bit stream.

In order to enhance protection against of error of the synchronization word S, a correlation threshold is employed that indicates a number of bits that a data word identical to the synchronization word S must have in order to be classified as synchronization word S. When the correlation threshold is selected too high, then the plurality of unrecognized synchronization words S will increase since transmission errors falsify the synchronization word S.

If a correlation threshold selected too low, more synchronization words S are recognized. However, the number of incorrectly classified synchronization words S also increases as more synchronization words S are recognized.

Given a length of the synchronization word S of 32 bits, a correlation threshold of 27 bits has proven adequate.

When the synchronization word S was correctly identified and when the check information Ki was also correctly decoded, then the position of the synchronization word S of the following data segment DSi+1 is determined upon employment of the segment length field MPL.

Thus it is intuitive to lower the correlation threshold for the identified position in order to increase the resistance error. In this case, a correlation threshold of 23 bits has proven adequate In order to prevent faulty decoding, the present invention also searches for the synchronization word S in the payload data information NDi, wherein the correlation threshold, however, is selected high in order to avoid the detection of incorrect synchronization words S. In this case, a correlation threshold of 30 bits has proven adequate The present invention also includes analyzing preceding data segments DSi−1 in the decoding in order to defectively determine the position of the synchronization word S of the data segment DSi and, thus, the position of the check information Ki in the data segment DSi as well. When the decoding of the check information Ki in the data segment DSi is now-error-free, then conclusions can be drawn dependent on the correlation result that the data segment DSi was correctly recognized.

When the check information Ki in the data segment DSi is not decoded, then the segment length field MPL cannot be employed. In this case, the synchronization word S of the following data segment DSi+1 is determined. It is thus known how many bits are between the successive synchronization words S. The length of the payload data information NDi and, thus, the value of the segment length field MPL is calculated from this information (check information Ki and synchronization word S have fixed lengths). It is thus possible to correct the segment length field MPL on the basis of the calculation. Hence the probability of a correct decoding of the check information Ki increases.

A few alternatives to the exemplary embodiment described above are disclosed below.

The plurality of bits in the aforementioned fields in the check information Ki are freely prescribable and not critical to the invention.

The employment of the synchronization word is not required but increases the resistance to error in the data transmission. The resistance to error that can be achieved is increased as the synchronization word selected becomes longer.

The error recognition information and/or error correction information contained in the BCH field can be formed in an arbitrary way upon employment of a code for error recognition and/or error correction. The employment of the BCH field is optional in the framework of the invention.

What is to be understood by a computer in this context is a device having a processor unit with which the above-described method steps can be implemented including, for example, a picture telephone with integrated microprocessor.

The invention can be clearly seen therein that a length particular of the respective data segment is contained in the check information of the data segment, as a result whereof a dependable synchronization and, thus, improved resistance to error is achieved.

While this invention has been described in connection with what is presently considered to be the most practical and preferred embodiment, it is to be understood that the invention is not limited to the disclosed embodiment, but, on the contrary, it is intended to cover various modifications and equivalent arrangements included within the spirit and scope of the appended claims.

What is claimed is:

1. A method for decoding at least one data segment comprising the steps of:

receiving a bit stream with at least one data segment, wherein the at least one data segment contains check information and payload information, the check information including information concerning a length of the payload information and synchronization information;

identifying the synchronization information in the received bit stream in order to find the start of the at least one data segment within the bit stream, wherein the synchronization information is identified by employing a correlation threshold that indicates a number of bits that a data word identical to the synchronization information must have in order to be classified as synchronization information; and decoding the at least one data segment dependent on the length of the payload information and the synchronization information.

2. The method according to claim 1, wherein the check information contains information concerning a type of digital data contained in the at least one data segment.

3. The method according to claim 2, wherein the information,concerning the type of digital data has a length of 4 bits.

4. The method according to claim 1, wherein the information concerning the length of the payload information has a length of 7 bits.

5. The method according to claim 1, wherein the respective synchronization information comprises a bit sequence of 32 bits and the correlation threshold comprises 27 bits.

6. The method according to claim 5, wherein the correlation threshold is lowered to 23 bits for the identified position of the synchronization information.

7. The method according to claim 5, wherein the correlation threshold is increased to 30 bits for identifying the synchronization information in the payload information.

8. A method for decoding a plurality of data segments comprising the steps of:

receiving a bit stream with a plurality of encoded data segments, wherein each of the plurality of encoded data segments contains respective check information and respective payload information, the respective check information including information concerning a length of the respective payload information and respective synchronization information;

identifying the synchronization information in the received bit stream in order to find the start of at least one data segment within the bit stream, wherein the synchronization information is identified by employing a correlation threshold that indicates a number of bits that a data word identical to the synchronization information must have in order to be classified as synchronization information; and decoding each of the plurality of encoded data segments, dependent on the length of the respective payload information of at least one other of the plurality of encoded data segments and also dependent on the respective synchronization information of at least one other of the plurality of encoded data segments.

9. The method according to claim 8, wherein the check information contains information concerning a type of digital data contained in each of the plurality of encoded data segments.

10. The method according to claim 8, wherein the information concerning the length of the respective payload information has a length of 7 bits.

11. The method according to claim 8, wherein the synchronization information comprises a bit sequence of 32 bits and the correlation threshold comprises 27 bits.

12. The method according to claim 11, wherein the correlation threshold is lowered to 23 bits for the identified position of the synchronization information.

13. The method according to claim 11, wherein the correlation threshold is increased to 30 bits for identifying the synchronization information in the payload information.

14. The method according to claim 8, wherein the position of the respective synchronization information of a data segment is determined from a length of the respective synchronization information, a length of the respective check information and the length of the respective payload information of a preceding data segment.

15. A method for encoding, transmitting and decoding digital data comprising:

grouping the digital data into at least one data segment;

encoding the at least one data segment, wherein information concerning a length of payload information of the at least one data segment is entered into check information within the at least one data segment and synchronization information is allocated to the at least one data segment during encoding of the data segment;

transmitting the data segment;

receiving a bit stream with the data segment at a receiver;

identifying the synchronization information in the received bit stream in order to find the start of the at least one data segment within the bit stream, wherein the synchronization information is identified by employing a correlation threshold that indicates a number of bits that a data word identical to the synchronization information must have in order to be classified as synchronization information; and decoding the at least one data segment dependent on the length of the payload information and the synchronization information.

16. The method according to claim 15, wherein the check information contains information concerning the type of digital data contained in the at least one data segment.

17. The method according to claim 15, wherein the information concerning the length of the payload information has a length of 7 bits.

18. The method according to claim 15, wherein the digital data are assembled into a plurality of data segments and each of the plurality of data segments are decoded dependent on the length of the respective payload information of at least one other of the plurality of encoded data segments and also dependent on respective synchronization information of at least one other of the plurality of encoded data segments.

19. The method according to claim 15, wherein the synchronization information comprises a bit sequence of 32 bits and the correlation threshold comprises 27 bits.

20. The method according to claim 19, wherein the correlation threshold is lowered to 23 bits for the identified position of the synchronization information.

21. The method according to claim 19, wherein the correlation threshold is increased to 30 bits for identifying the synchronization information in the payload information.

22. A method for encoding, transmitting and decoding digital data comprising the steps of:

grouping the digital data into a plurality of data segments;

encoding each of the plurality of data segments, wherein respective information concerning a length of payload information of a data segment is entered into check information within each respective data segment of the plurality of data segments and synchronization information is allocated to each respective data segment of the plurality of data segments during encoding of the plurality data segments;

transmitting the plurality of data segments;

receiving a bit stream with the plurality of data segments at a receiver;

identifying the synchronization information in the received bit stream in order to find the start of at least one data segment within the bit stream, wherein the synchronization information is identified by employing a correlation threshold that indicates a number of bits that a data word identical to the synchronization information must have in order to be classified as synchronization information; and decoding each of the plurality of data segments dependent on the length of the respective payload information of at least one other of the plurality of data segments and also dependent on respective synchronization information of at least one other of the plurality of data segments.

23. The method according to claim 22, wherein the check information contains information concerning the type of digital data contained in each respective data segment of the plurality of data segments.

24. The method according to claim 22, wherein the information concerning the length of the payload information of each of the plurality of data segments has a length of 7 bits.

25. The method according to claim 22, wherein the synchronization information comprises a bit sequence of 32 bits and the correlation threshold comprises 27 bits.

26. The method according to claim 25, wherein the correlation threshold is lowered to 23 bits for the identified position of the synchronization information.

27. The method according to claim 25, wherein the correlation threshold is increased to 30 bits for identifying the synchronization information in the payload information.

28. The method according to claim 22, wherein the position of the respective synchronization information of a following data segment is determined from a length of the respective synchronization information, a length of the respective check information and the length of the respective payload information of a preceding data segment.

29. A method for encoding, transmitting and decoding digital data comprising the steps of:

grouping the digital data into a plurality of data segments;

encoding each of the plurality of data segments, wherein respective information concerning a length of payload information of a respective data segment of the plurality of data segments is entered into check information within the respective data segment and synchronization information is allocated to the respective data segment of the plurality of data segments during encoding of the plurality of data segments;

transmitting the plurality of data segments;

receiving a bit stream with the plurality of data segments at a receiver;

identifying the synchronization information in the received bit stream in order to find the start of at least one data segment within the bit stream, wherein the synchronization information is identified by employing a correlation threshold that indicates a number of bits that a data word identical to the synchronization information must have in order to be classified as synchronization information; and decoding each of the plurality of data segments dependent on the length of the payload information of the respective data segment and the length of the payload information of at least one other of the plurality of data segments and also dependent on synchronization information of the respective data segment and synchronization information of at least one other of the plurality of data segments.

30. The method according to claim 29, wherein the check information contains information concerning the type of digital data contained in the respective data segment.

31. The method according to claim 29, wherein the information concerning the length of the payload information of a data segment has a length of 7 bits.

32. The method according to claim 29, wherein the respective synchronization information comprises a bit sequence of 32 bits and the correlation threshold comprises 27 bits.

33. The method according to claim 32, wherein the correlation threshold is lowered to 23 bits for the identified position of the synchronization information.

34. The method according to claim 32, wherein the correlation threshold is increased to 30 bits for identifying the synchronization information in the payload information.

35. The method according to claim 29, wherein the position of the respective synchronization information of a following data segment is determined from a length of the respective synchronization information, a length of the respective check information and the length of the respective payload information of a preceding data segment.

36. An apparatus for decoding at least one data segment comprising:

a receiver unit for receiving a bit stream with the at least one data segment, wherein the at least one data segment contains check information and payload information, the check information concerning a length of the payload information and synchronization information; and a processor unit configured to identify the synchronization information in the received bit stream in order to find the start of the at least one data segment within the bit stream, wherein the synchronization information is identified by employing a correlation threshold that indicates a number of bits that a data word identical to the synchronization information must have in order to be classified as synchronization information, and to decode the at least one data segment received by the receiver unit dependent on the length of the payload information and the synchronization information.

37. The apparatus according to claim 36, wherein the check information contains information concerning a type of digital data contained in the at least one data segment.

38. The apparatus according to claim 37, wherein at least one of the length of the payload information and the information concerning the type of digital data is secured with at least one of error recognition information and error correction information.

39. The apparatus according to claim 36, wherein the information concerning the length of the payload information has a length of 7 bits.

40. The apparatus according to claim 36, wherein the synchronization information comprises a bit sequence of 32 bits and the correlation threshold comprises 27 bits.

41. The apparatus according to claim 40, wherein the correlation threshold is lowered to 23 bits for the identified position of the synchronization information.

42. The apparatus according to claim 40, wherein the correlation threshold is increased to 30 bits for identifying the synchronization information in the payload information.

43. An apparatus for decoding a plurality of data segments comprising:
a receiver unit for receiving a bit stream with a plurality of data segments, wherein each of the plurality of data segments contains respective check information and respective payload information, the respective check information including information concerning a length of respective payload information and respective synchronization information; and
a processor unit configured to identify the synchronization information in the received bit stream in order to find the start of at least one data segment within the bit stream, wherein the synchronization information is identified by employing a correlation threshold that indicates a number of bits that a data word identical to the synchronization information must have in order to be classified as synchronization information, and to decode each of the plurality of encoded data segments, dependent on the length of the payload information of the respective data segment and also dependent on synchronization information of the respective data segment.

44. The apparatus according to claim 43, wherein the check information contains information concerning a type of digital data contained in the respective data segment.

45. The apparatus according to claim 44, wherein at least one of the length of the respective payload information and the information concerning the type of digital data is secured with at least one of error recognition information and error correction information.

46. The apparatus according to claim 43, wherein the information concerning the particular length of the respective payload information has a length of 7 bits.

47. The apparatus according to claim 43, wherein the synchronization information comprises a bit sequence of 32 bits and the correlation threshold comprises 27 bits.

48. The apparatus according to claim 47, wherein the correlation threshold is lowered to 23 bits for the identified position of the synchronization information.

49. The apparatus according to claim 47, wherein the correlation threshold is increased to 30 bits for identifying the synchronization information in the payload information.

50. The apparatus according to claim 43, wherein the position of the respective synchronization information of a data segment is determined from a length of the respective synchronization information, a length of the respective check information and the length of the respective payload information of a preceding data segment.

51. An arrangement for encoding, transmitting and decoding digital data comprising:
a first apparatus having a first processor unit configured to group the digital data in at least one data segment and encode the least one data segment, wherein information concerning a length of payload information of the at least one data segment is entered into check information within the at least one data segment and synchronization information is allocated to the at least one data segment during encoding of the data segment;
a transmitter for transmitting the at least one data segment; and
a second apparatus having a receiver unit for receiving a bit stream with the transmitted at least one data segment and a second processor unit configured to identify the synchronization information in the received bit stream in order to find the start of the at least one data segment within the bit stream, wherein the synchronization information is identified by employing a correlation threshold that indicates a number of bits that a data word identical to the synchronization information must have in order to be classified as synchronization information, and to decode the at least one data segment dependent on the length of the payload information and the synchronization information.

52. The arrangement according to claim 51, wherein the first processor unit is configured to group the digital data into a plurality of data segments and the second processor unit is configured to decode each of the plurality of data segments dependent on at least one of the length of the payload information of at least one other of the plurality of data segments and the synchronization information of at least one other of the plurality of data segments.

53. The arrangement according to claim 51, wherein the check information contains information concerning the type of digital data contained in the at least one data segment.

54. The arrangement according to claim 51, wherein at least one of the length of the payload information of the at least one data segment and the information concerning the type of digital data is secured with at least one of error recognition information and error correction information.

55. The arrangement according to claim 51, wherein the information concerning the length of the payload information of the at least one data segment has a length of 7 bits.

56. The arrangement according to claim 51, wherein the synchronization information comprises a bit sequence of 32 bits and the correlation threshold comprises 27 bits.

57. The arrangement according to claim 56, wherein the correlation threshold is lowered to 23 bits for the identified position of the synchronization information.

58. The arrangement according to claim 56, wherein the correlation threshold is increased to 30 bits for identifying the synchronization information in the payload information.

59. An arrangement for encoding, transmitting and decoding digital data comprising:
a first apparatus having a first processor unit configured to group the digital data in a plurality of data segments and encode each of the plurality of data segments, wherein information concerning a length of payload information of a respective data segment of the plurality of data segments is entered into check information within the respective data segment and synchronization information is allocated to the respective data segment of the plurality of data segments during encoding of the plurality of data segments;

a transmitter for transmitting the plurality of data segments; and a second apparatus having a receiver unit for receiving a bit stream with the transmitted plurality of data segments and a second processor unit configured to identify the synchronization information in the received bit stream in order to find the start of at least one data segment within the bit stream, wherein the synchronization information is identified by employing a correlation threshold that indicates a number of bits that a data word identical to the synchronization information must have in order to be classified as synchronization information, and to decode each of the plurality of data segments dependent on the length of the payload information of at least one other of the plurality of data segments and also dependent on synchronization information of at least one other of the plurality of data segments.

60. The apparatus according to claim 59, wherein the check information contains information concerning the type of digital data contained in the respective data segment.

61. The apparatus according to claim 59, wherein at least one of the length of the respective payload information and the information concerning the type of digital data is secured with at least one of error recognition information and error correction information.

62. The apparatus according to claim 59, wherein the information concerning the length of the respective payload information has a length of 7 bits.

63. The arrangement according to claim 59, wherein the respective synchronization information comprises a bit sequence of 32 bits and the correlation threshold comprises 27 bits.

64. The arrangement according to claim 63, wherein the correlation threshold is lowered to 23 bits for the identified position of the synchronization information.

65. The arrangement according to claim 63, wherein the correlation threshold is increased to 30 bits for identifying the synchronization information in the payload information.

66. The arrangement according to claim 59, wherein the position of the respective synchronization information of a following data segment is determined from a length of the respective synchronization information, a length of the respective check information and the length of the respective payload information of a preceding data segment.

* * * * *